United States Patent
Oggianu et al.

(10) Patent No.: US 11,153,004 B2
(45) Date of Patent: Oct. 19, 2021

(54) CONVEYANCE SYSTEM DATA TRANSFER

(71) Applicant: Otis Elevator Company, Farmington, CT (US)

(72) Inventors: Stella M. Oggianu, Farmington, CT (US); Tadeusz Pawel Witczak, Farmington, CT (US); Craig Drew Bogli, Avon, CT (US); Pawel Skiba, Poznań (PL)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 16/014,321

(22) Filed: Jun. 21, 2018

(65) Prior Publication Data

US 2019/0393950 A1 Dec. 26, 2019

(51) Int. Cl.
*H04B 7/155* (2006.01)
*H04W 88/16* (2009.01)
*H04W 4/80* (2018.01)

(52) U.S. Cl.
CPC ........... *H04B 7/15507* (2013.01); *H04W 4/80* (2018.02); *H04W 88/16* (2013.01)

(58) Field of Classification Search
CPC ......... B66B 1/3461; B66B 1/46; B66B 1/468; B66B 5/0012; B66B 2201/402; B66B 2201/4653
USPC ................................. 370/254, 315
See application file for complete search history.

(56) References Cited

U.S. PATENT DOCUMENTS

| 935,516 A | 9/1909 | Jewett |
| 5,832,363 A | 11/1998 | Moriya et al. |
| 5,848,669 A | 12/1998 | Park |
| 6,711,148 B1 | 3/2004 | Hills |
| 7,126,951 B2 | 10/2006 | Belcea et al. |
| 7,426,981 B2 | 9/2008 | Bacellar et al. |
| 7,546,372 B2 | 6/2009 | Allen et al. |
| 2010/0201482 A1* | 8/2010 | Robertson ................ G07C 9/28 340/5.61 |
| 2012/0327826 A1* | 12/2012 | Lin ......................... H04W 4/50 370/310 |

(Continued)

FOREIGN PATENT DOCUMENTS

| CN | 204980676 U | 1/2016 |
| CN | 105492360 A | 4/2016 |

(Continued)

OTHER PUBLICATIONS

J. Geier, "How to: Provide WiFi Coverage Inside Elevators" Wireless-Nets, 2013, p. 1-2.

(Continued)

*Primary Examiner* — Melvin C Marcelo
*Assistant Examiner* — Natali Pascual Peguero
(74) *Attorney, Agent, or Firm* — Cantor Colburn LLP

(57) ABSTRACT

The method for data transfer in a conveyance system including: moving a conveyance apparatus and a mobile wireless access point attached to the conveyance apparatus to a location where the mobile wireless access point is within wireless range of a communication node; receiving data from the communication node when the mobile wireless access point is within wireless range of the communication node; and conveying the data to a local gateway device or a second mobile wireless access point attached to a second conveyance apparatus.

18 Claims, 3 Drawing Sheets

(56) References Cited

U.S. PATENT DOCUMENTS

| | | |
|---|---|---|
| 2013/0188508 A1 | 7/2013 | Cho et al. |
| 2014/0045479 A1 | 2/2014 | Shinada et al. |
| 2016/0176678 A1 | 6/2016 | Kusserow |
| 2016/0185568 A1 | 6/2016 | Kusserow |
| 2016/0311647 A1* | 10/2016 | Peterson ............... B66B 1/3461 |
| 2017/0081149 A1 | 3/2017 | Dugan et al. |
| 2017/0228953 A1 | 8/2017 | Lupovici |
| 2017/0272911 A1 | 9/2017 | Agrawal et al. |
| 2017/0350615 A1 | 12/2017 | Ashar |
| 2018/0182199 A1* | 6/2018 | Yamine .................. B66B 5/024 |

FOREIGN PATENT DOCUMENTS

| | | | |
|---|---|---|---|
| CN | 205662176 U | | 10/2016 |
| EP | 0522782 A2 | | 1/1993 |
| EP | 3124418 A1 | * | 2/2017 |
| EP | 3190075 A1 | | 7/2017 |
| KR | 20180010634 A | | 1/2018 |
| WO | 2005053189 A1 | | 6/2005 |

OTHER PUBLICATIONS

J. Spindler, "A New Solution for Wireless Coverage in Elevators" Opinion Article, May 2, 2016, p. 1-6.

M. Trucano, "Using Mobile Phones in Data Collection: Opportunities, Issues and Challenges", The World Bank, Edutech, May 4, 2018, p. 1-6.

Whitepages, "Overview of the Captivate Elevator Network Product" Captivate Network, 2013, p. 1-7.

The Extended European Search Report for Application No. 19180469.9-1017; dated Feb. 4, 2020; Report Received Date: Feb. 20, 2020; 10 pages.

China Examination Report for China Application No. 201910537086.4; Application Filing Date: Jun. 20, 2019; dated Sep. 1, 2020, 8 pages.

* cited by examiner

CONVEYANCE SYSTEM DATA TRANSFER

BACKGROUND

The embodiments herein relate to the field of conveyance systems, and specifically to a method and apparatus for transferring data in a conveyance system.

Conveyance systems, such as, for example, elevator systems, escalator systems, moving walkways, metro systems (e.g., subway systems), train systems, conveyer systems, and production lines may need to communicate with other devices or systems in a wireless manner. Often, the available network signal strength varies as a conveyance system component moves along a travel path, such as vertically in an elevator hoistway. The available network signal strength can be too low for effective wireless communication at certain locations along the travel path.

BRIEF SUMMARY

According to an embodiment, a method for data transfer in a conveyance system is provided. The method including: moving a conveyance apparatus and a mobile wireless access point attached to the conveyance apparatus to a location where the mobile wireless access point is within wireless range of a communication node; receiving data from the communication node when the mobile wireless access point is within wireless range of the communication node; and conveying the data to a local gateway device or a second mobile wireless access point attached to a second conveyance apparatus.

In addition to one or more of the features described herein, or as an alternative, further embodiments may include that conveying the data to a local gateway device further includes: saving the data to a memory of the mobile wireless access point; moving the conveyance apparatus and the mobile wireless access point to a location where the mobile wireless access point is within wireless range of a local gateway device; and transmitting the data from the memory of the mobile wireless access point to the local gateway device.

In addition to one or more of the features described herein, or as an alternative, further embodiments may include that the data is received from the communication node to the mobile wireless access point via short-range wireless protocol.

In addition to one or more of the features described herein, or as an alternative, further embodiments may include that conveying the data to a local gateway device further includes: transmitting the data from the mobile wireless access point to the second mobile wireless access point attached to the second conveyance apparatus, the second mobile wireless access point is configured to transmit the data from the second mobile wireless access point to the local gateway device.

In addition to one or more of the features described herein, or as an alternative, further embodiments may include that conveying the data to a local gateway device further includes: transmitting the data from the mobile wireless access point to the second mobile wireless access point attached to the second conveyance apparatus; moving the second conveyance apparatus and the second mobile wireless access point to a location where the second mobile wireless access point is within wireless range of a local gateway device; and transmitting the data from the second mobile wireless access point to the local gateway device.

In addition to one or more of the features described herein, or as an alternative, further embodiments may include that the conveyance system is an elevator system and the conveyance apparatus is an elevator car.

In addition to one or more of the features described herein, or as an alternative, further embodiments may include that the local gateway device is configured to transmit the data to a remote system via long-range wireless protocol.

In addition to one or more of the features described herein, or as an alternative, further embodiments may include: saving the data to a memory of the mobile wireless access point.

According to another embodiment, a method for data transfer in a conveyance system is provided. The method including: conveying data from a local gateway device to the mobile wireless access point attached to a conveyance apparatus; and transmitting the data from the mobile wireless access point when the mobile wireless access point is within wireless range of the communication node.

In addition to one or more of the features described herein, or as an alternative, further embodiments may include that conveying data from a local gateway device to a mobile wireless access point attached to a conveyance apparatus further includes: moving the conveyance apparatus and the mobile wireless access point to a location where the mobile wireless access point is within wireless range of a local gateway device; receiving the data from the local gateway device to the mobile wireless access point; and saving the data to a memory of the mobile wireless access point.

In addition to one or more of the features described herein, or as an alternative, further embodiments may include that the data is conveyed from local gateway device to the mobile wireless access point via short-range wireless protocol.

In addition to one or more of the features described herein, or as an alternative, further embodiments may include that conveying data from a local gateway device to a mobile wireless access point attached to a conveyance apparatus further includes: receiving data the local gateway device to a second mobile wireless access point attached to a second conveyance apparatus, the second mobile wireless access point is configured to transmit the data to the mobile wireless access point.

In addition to one or more of the features described herein, or as an alternative, further embodiments may include that conveying data from a local gateway device to a mobile wireless access point attached to a conveyance apparatus further includes: receiving data from a local gateway device to a second mobile wireless access point attached to a second conveyance apparatus; moving the second conveyance apparatus and the second mobile wireless access point to a location where the second mobile wireless access point is within wireless range of the mobile wireless access point; and transmitting the data from the second mobile wireless access point to the mobile wireless access point.

In addition to one or more of the features described herein, or as an alternative, further embodiments may include that the conveyance system is an elevator system and the conveyance apparatus is an elevator car.

In addition to one or more of the features described herein, or as an alternative, further embodiments may include that the local gateway device is configured to receive the data from a remote system via long-range wireless protocol.

In addition to one or more of the features described herein, or as an alternative, further embodiments may include saving the data to a memory of the mobile wireless access point.

In addition to one or more of the features described herein, or as an alternative, further embodiments may include: moving the conveyance apparatus and the mobile wireless access point attached to the conveyance apparatus to a location where the mobile wireless access point is within wireless range of a communication node.

According to another embodiment, a conveyance system is provided. The conveyance system including: a conveyance apparatus: a mobile wireless access point attached to the control, the mobile wireless access point including: a processor; a memory including computer-executable instructions that, when executed by the processor, cause the processor to perform operations, the operations including: moving a conveyance apparatus and a mobile wireless access point attached to the conveyance apparatus to a location where the mobile wireless access point is within wireless range of the communication node; receiving data from a communication node when the mobile wireless access point is within wireless range of the communication node; and conveying the data to a local gateway device or a second mobile wireless access point attached to a second conveyance apparatus.

In addition to one or more of the features described herein, or as an alternative, further embodiments may include that conveying the data to a local gateway device further includes: moving the conveyance apparatus and the mobile wireless access point to a location where the mobile wireless access point is within wireless range of a local gateway device; and transmitting the data from the mobile wireless access point to the local gateway device.

In addition to one or more of the features described herein, or as an alternative, further embodiments may include that the data is received from the communication node via short-range wireless protocol.

Technical effects of embodiments of the present disclosure include creating a wireless data network utilizing mobile wireless access points located on conveyance apparatus configured to receive, store, and then transmit data outside of the building when in a selected location along a travel path of the conveyance apparatus.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
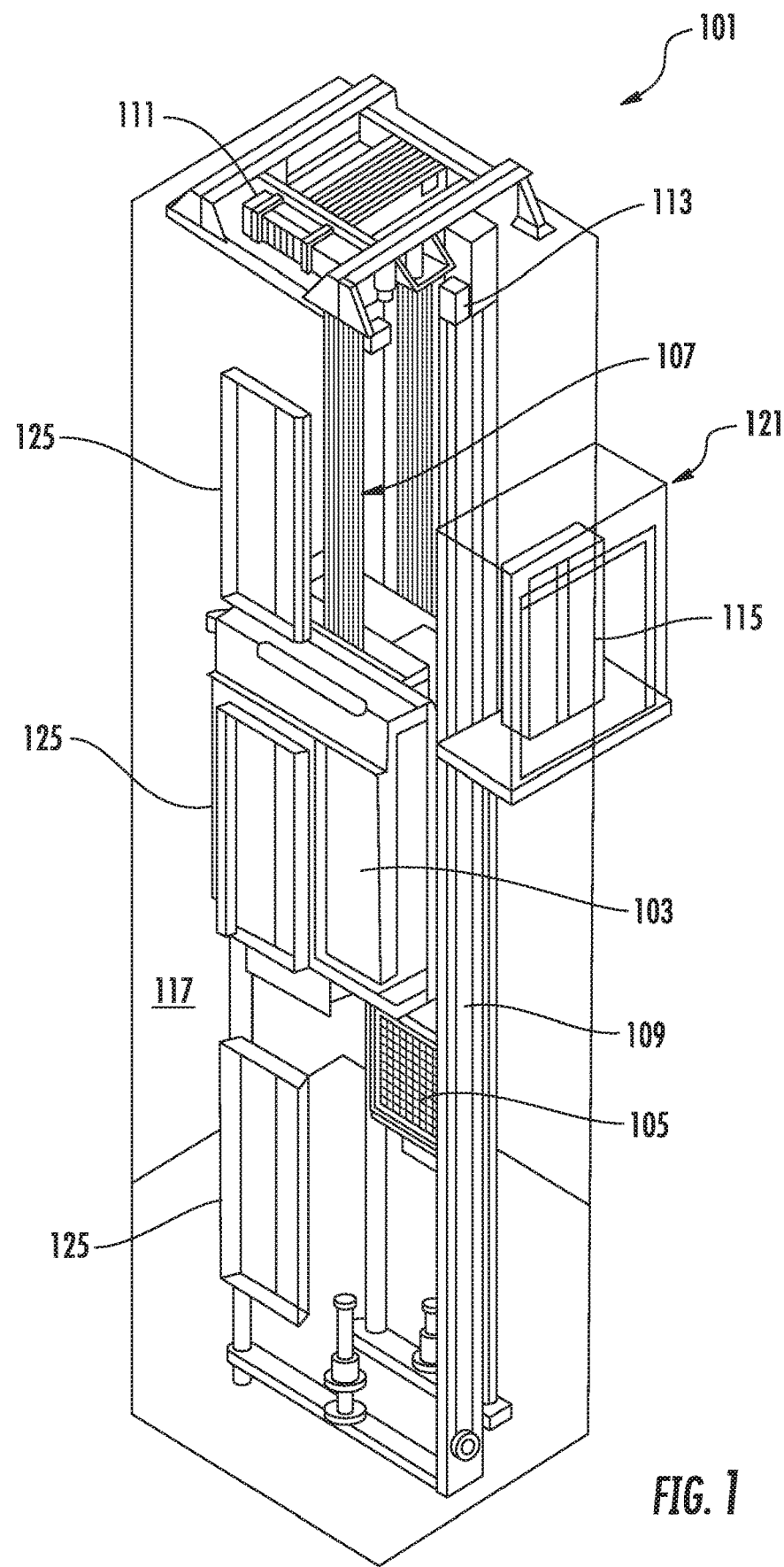
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a system controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The system controller 115 is located, as shown, in a controller room 121 of the elevator shaft 117 and is configured to control the operation of the elevator system 101, and particularly the elevator car 103. For example, the system controller 115 may provide drive signals to the machine 111 to control the acceleration, deceleration, leveling, stopping, etc. of the elevator car 103. The system controller 115 may also be configured to receive position signals from the position reference system 113 or any other desired position reference device. When moving up or down within the elevator shaft 117 along guide rail 109, the elevator car 103 may stop at one or more landings 125 as controlled by the system controller 115. Although shown in a controller room 121, those of skill in the art will appreciate that the controller 115 can be located and/or configured in other locations or positions within the elevator system 101. In one embodiment, the system controller 115 may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

In other embodiments, the system comprises a conveyance system that moves passengers between floors and/or along a single floor. Such conveyance systems may include escalators systems, moving walkways, metro systems (e.g., subway systems), train systems, conveyer systems, production lines, people movers, etc. Accordingly, embodiments described herein are not limited to elevator systems, such as that shown in FIG. 1. In one example, embodiments disclosed herein may be applicable conveyance systems such as an elevator system 101 and a conveyance system component such as an elevator car 103 of the elevator system 101. In another example, embodiments disclosed herein may be applicable conveyance systems such as an escalator system and a conveyance system component such as a moving stair of the escalator system.

Figure 2:
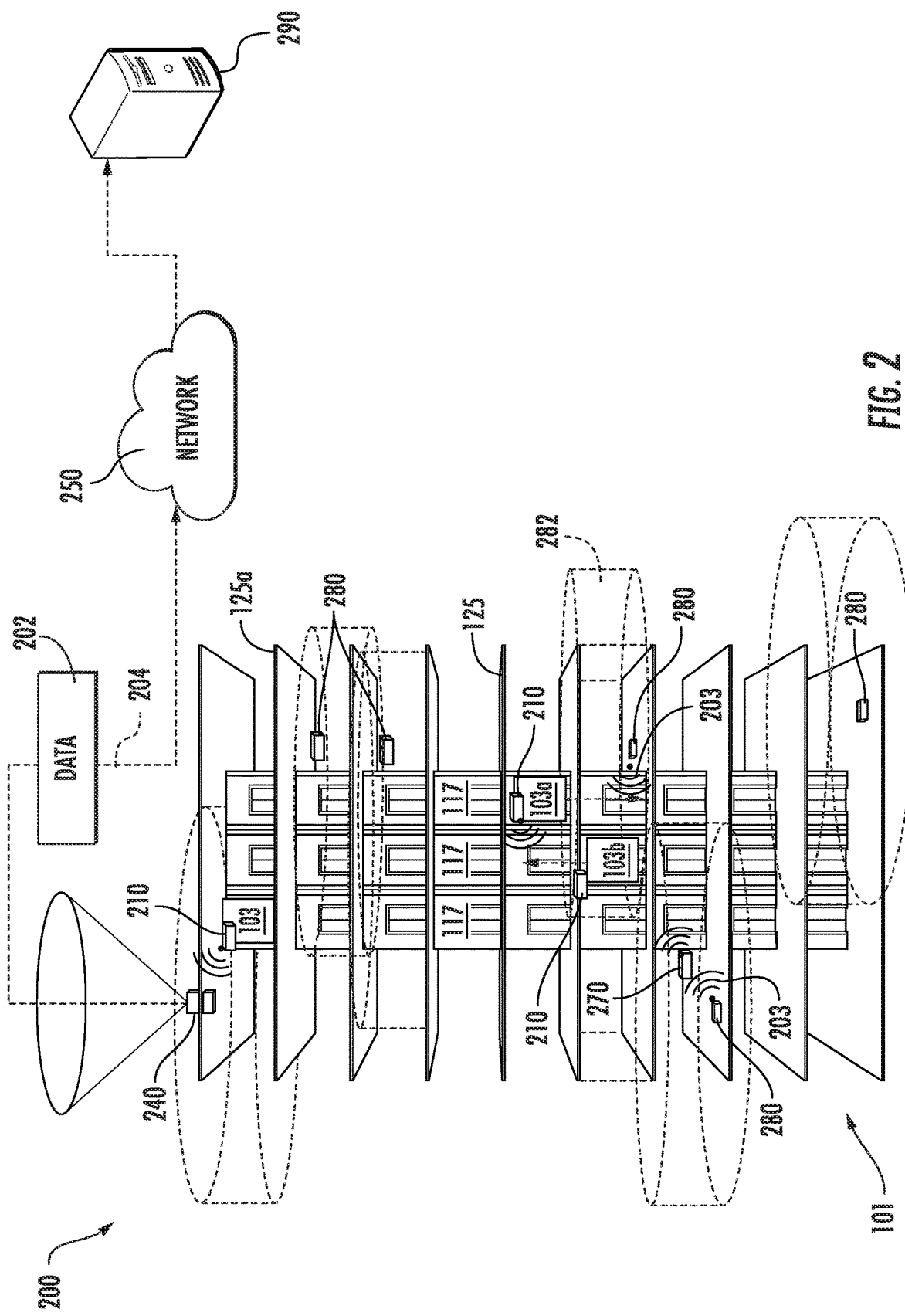
FIG. 2 is a schematic illustration of a data network for the elevator system of FIG. 1, in accordance with an embodiment of the disclosure.

FIG. 2 is a view of a data network 200 including one or more mobile wireless access points 210, according to an embodiment of the present disclosure. The mobile wireless access point 210 may be a radio communication device capable of communicating via short-range wireless protocols 203 (e.g., BLE, Zwave, BT, Wi-Fi, ZigBee, and IEEE 802.15.4 Sub-GHz). The mobile wireless access points 210 may also be capable of communicating via long-range wireless protocols 204 internally within a building but may be in a location within the building such that communication via long-range wireless protocols 204 to a device located outside of the building may be difficult. As shown in FIG. 2, the mobile wireless access points 210 are each located on an elevator car 103 and are configured to move up and down throughout a respective hoistway 117 with the elevator car 103. Alternatively, the wireless access point 210 can be located on another part of the elevator system 101 that moves through the hoistway 117, such as, for example, the counterweight 105. The mobile wireless access points 210 are configured to communicate via short-range wireless protocols 203 with communication nodes 280, other mobile wireless access points 210, and a local gateway device 240. Additionally the data network 200 may include one or more stationary information buffers 270 that could be assist with moving data 202 from lower landings 125 to the higher landings 125 or in horizontal motion (i.e., act like a temporary buffer in systems that don't have continuous communication). The mobile wireless access points 210 are configured to transfer data 202 between the communication nodes 280 and the local gateway device 240, then the local gateway device 240 is configured to transmit the data 202 to a remote system 280 through a network 250 via long-range wireless protocol 204. The local gateway device 240 may also receive data 202 from the remote system 280 through the network 250 via long-range protocol 204 and then the data 202 may be distributed to communication nodes 280 by the mobile wireless access points 210. The network 250 may be a computing network, such as, for example, a cloud computing network, cellular network, satellite network, or any other computing network known to one of skill in the art. The network 250 may also be a computing network hardwired from the local gateway device 240 to the remote system 280.

The communication nodes 280 may be low power devices with a limited wireless range 282. The communication nodes 280 not be able to communicate wirelessly through building landings 125 due to the limited wireless range of the communication nodes 280. The communication nodes 280 may be dedicated devices specifically for transferring data 202 to the mobile wireless access points 210 or may be dual devices that serve other functions in addition to transferring data 200 to the mobile wireless access points 210, such as, for example, a thermostat, a smoke sensor, a CO detector, a $CO_2$ detector. The communication node 280 is configured to transmit data 202 to a mobile wireless access point 210 via short-range wireless protocol 203 when the mobile wireless access point 210 is located within the wireless range 282 of the communication node 280. Short-range wireless protocols 203 may include but are not limited to Bluetooth, Wi-Fi, HaLow (801.11ah), zWave, Zigbee, RFID, or Wireless M-Bus. The mobile wireless access point 210 may only be located within the wireless range 282 of the communication node 280 if the mobile wireless access point 210 is located on the same landing 125 of the communication node 280 (e.g., if the communication node 280 cannot transmit through landings 125 of the building.

The mobile wireless access points 210 may then save the data 202 within a memory 216 of the of the mobile wireless access points 210 and then transmit the data 202 to the local gateway device 240 when the mobile wireless access point 210 is within a wireless range of the local gateway device 240. The mobile wireless access point 210 may also transmit the data 202 to another wireless access point 210 if it would be more efficient for the other wireless access point 210 to carry the data 202 to the local gateway device 240. For example, if a wireless access point 210 on a first elevator car 103a was traveling downward and passing a wireless access point 210 on a second elevator car 103b travelling upward to the local gateway device 240 then the wireless access point 210 on the first elevator car 103a may transfer data 202 to the wireless access point 210 on the second elevator car 103b, so that the wireless access point 210 on the second elevator car 103b could convey the data 202 up to the local gateway device 240.

The mobile wireless access point 210 may only be located within the wireless range of the local gateway device 240 if the mobile wireless access point 210 is located on the same landing 125 of the local gateway device 240 (e.g., if the mobile wireless access point 210 cannot transmit through landings 125 of the building). For example, if the mobile wireless access point 210 cannot transmit through landings 125 of the building and the local gateway device 240 is located on a top landing 125a then the mobile wireless access point 210 can only transmit data 202 to the local gateway device 240 when the mobile wireless access point 210 is on the top landing 125a.

In an embodiment, the mobile wireless access point 210 may be a passive rider of the elevator car 103 not having control of the movement of the elevator car 103, thus the data transfer rate may be a subservient to and dependent upon the schedule of the elevator car 103. In another embodiment, the mobile wireless access point 210 may be an active rider of the elevator car 130 configured to control the schedule and operation of the elevator car 103 to facilitate the transfer of data 202 between communication nodes and the local gateway device 240, and then onto the remote system 290. It is import to note that the process may also operate in reverse with data 202 being transferred from the remote system 290 to the local gateway device 240, to the mobile wireless access points 210, and onto the communication nodes 280, as illustrated by method 500 in FIG. 5.

The remote system 290 may be a computing device, such as, for example, a desktop computer, server, cloud computer, etc. The remote system 290 may also be a mobile computing device that is typically carried by a person, such as, for example a smartphone, PDA, smartwatch, tablet, laptop, etc. The remote system 290 may also be two or more separate devices that are synced together, such as, for example, a cellular phone and a desktop computer synced over an internet connection.

As mentioned above, short-range wireless protocols 203 facilitate communication: between communication nodes 280 and mobile wireless access points 210; between a mobile wireless access point 210 and another mobile wireless access point 210; and between the mobile wireless access points 210 and the local gateway device 240. Short-range wireless protocols 203 may include but are not limited to Bluetooth, Wi-Fi, HaLow (801.11ah), zWave, Zigbee, RFID, or Wireless M-Bus.

As mentioned above, long-range wireless protocols 204 facilitate communication: between the local gateway device 240 and the network 250; between the network 250 and the remote system 290; and between the local gateway device 240 and the remote system 290. In an embodiment, the local gateway device 240 may communicate directly with the remote system 290 via long-range wireless protocol 204. Long-range wireless protocols 204 may include but are not limited to cellular, satellite, GSM, CDMA, LTE (NB-IoT, CAT M1), LoRa, Ingenu or SigFox.

Figure 3:
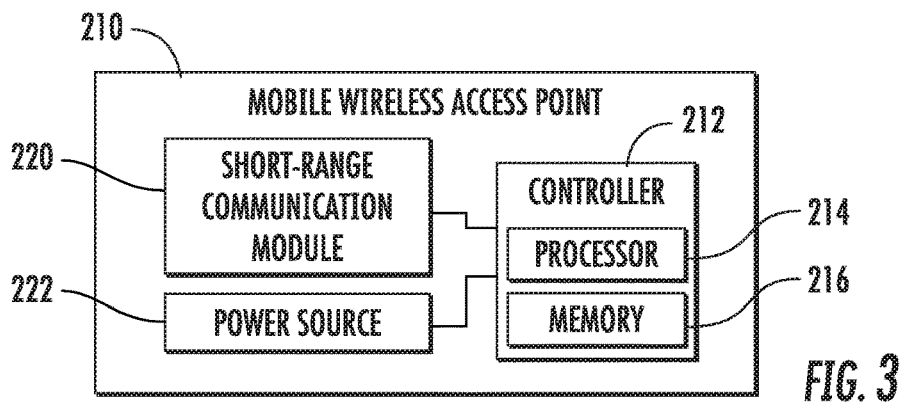
FIG. 3 is a schematic illustration of the location of a mobile wireless access point of the data network of FIG. 2, in accordance with an embodiment of the disclosure.

FIG. 3 illustrates a block diagram of the mobile wireless access point 210. It should be appreciated that, although particular systems are separately defined in the schematic block diagram of FIG. 3, each or any of the systems may be otherwise combined or separated via hardware and/or software. As shown in FIG. 3, the mobile wireless access point 210 may include a controller 212, a short-range communication module 220 in communication with the controller 212, and a power source 222 electrically connected to the controller 212.

The controller 212 of the mobile wireless access point 210 includes a processor 214 and an associated memory 216 comprising computer-executable instructions that, when executed by the processor 214, cause the processor 214 to perform various operations, such as, for example, processing the data 202. The processor 214 may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 216 may be a storage device, such as, for example, a random access memory (RAM), read only memory (ROM), or other electronic, optical, magnetic or any other computer readable medium.

The power source 222 of the mobile wireless access point 210 is configured to store and supply electrical power to the mobile wireless access point 210. The power source 222 may include an energy storage system, such as, for example, a battery system, capacitor, or other energy storage system known to one of skill in the art. The power source 222 may also generate electrical power for the mobile wireless access point 210. The power source 222 may also include an energy generation or electricity harvesting system, such as, for example synchronous generator, induction generator, or other type of electrical generator known to one of skill in the art.

The mobile wireless access point 210 includes a short-range communication module 220 located within the mobile wireless access point 210. The short-range communication module 220 is configured to allow the controller 212 of the mobile wireless access point 210 to communicate with the communication nodes 280, other mobile wireless access points 210, and the local gateway device 240 through short-range wireless protocols 203. The short-range communication module 220 may consist of one or more wireless transceivers capable of transmitting/receiving data 202 to/from the local gateway device 240 and the nodes 280. In an embodiment, the short-wave wireless protocol 203 for communication between the mobile wireless access point 210 and the communication nodes 280 may be different than the short-wave wireless protocol 203 for communication between the mobile wireless access point 210 and the local gateway device 240, and thus may require two different wireless transceivers within the short-range communication module 220.

Figure 4:
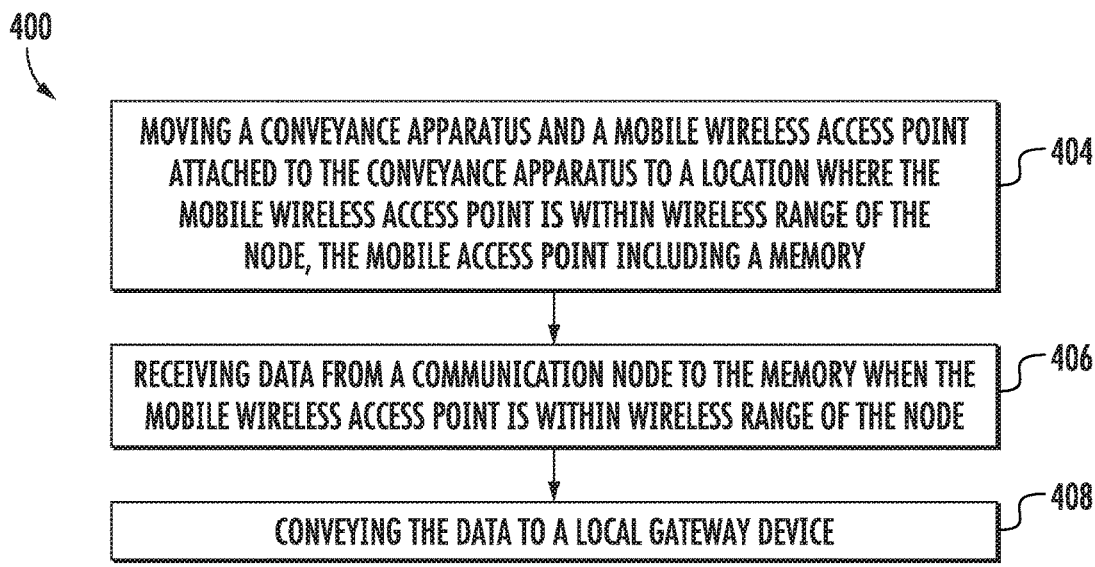
FIG. 4 is a flow chart of a method of data transfer in a conveyance system, in accordance with an embodiment of the disclosure.

Referring now to FIG. 4, while referencing components of FIGS. 1-3. FIG. 4 shows a flow chart of a method 400 for data transfer in a conveyance system, in accordance with an embodiment of the disclosure. FIG. 4 illustrates an embodiment where the data 202 is saved onto a memory 216 of the mobile wireless access point 210, however in other embodiments the data 202 may not be saved onto the memory 216 but is rather the data 202 is transferred through the mobile wireless access point 210 when the mobile wireless access point 210 is within range of both the communication node 280 and the local gateway device 240. At block 404, a conveyance apparatus and a mobile wireless access point 210 attached to the conveyance apparatus are moved to a location where the mobile wireless access point is within wireless range of the communication node 280. The mobile access point 210 including a memory 216.

At block 406, data 202 is received from a communication node 280 to the memory 216 when the mobile wireless access point 210 is within wireless range 282 of the communication node 280. The data 202 is received from the communication node 280 to the memory 216 via short-range wireless protocol 203.

At block 408, the data 202 is conveyed to a local gateway device 240. The data 202 may be conveyed to the local gateway device 240 by moving the conveyance apparatus and the mobile wireless access point 210 to a location where the mobile wireless access point 210 is within wireless range of a local gateway device 240; and transmitting the data 202 from the memory 216 of the mobile wireless access point 210 to the local gateway device 240.

The data 202 may also be conveyed to the local gateway device 240 by transmitting the data 202 from the memory 216 of the mobile wireless access point 210 to a memory 216 of a second mobile wireless access point attached to a second conveyance apparatus. The second mobile wireless access point 210 is configured to transmit the data 202 from the memory 216 of the second mobile wireless access point 210 to the local gateway device 240. The second conveyance apparatus 103*b* and the second mobile wireless access point 210 may be moved to a location where the second mobile wireless access point 210 is within wireless range of a local gateway device 240 and the data 202 is then transmitted from the memory 216 of the second mobile wireless access point 210 to the local gateway device 240. The conveyance system of method 400 may be an elevator system 101 and the conveyance apparatus may be an elevator car 103.

While the above description has described the flow process of FIG. 4 in a particular order, it should be appreciated that unless otherwise specifically required in the attached claims that the ordering of the steps may be varied.

Figure 5:
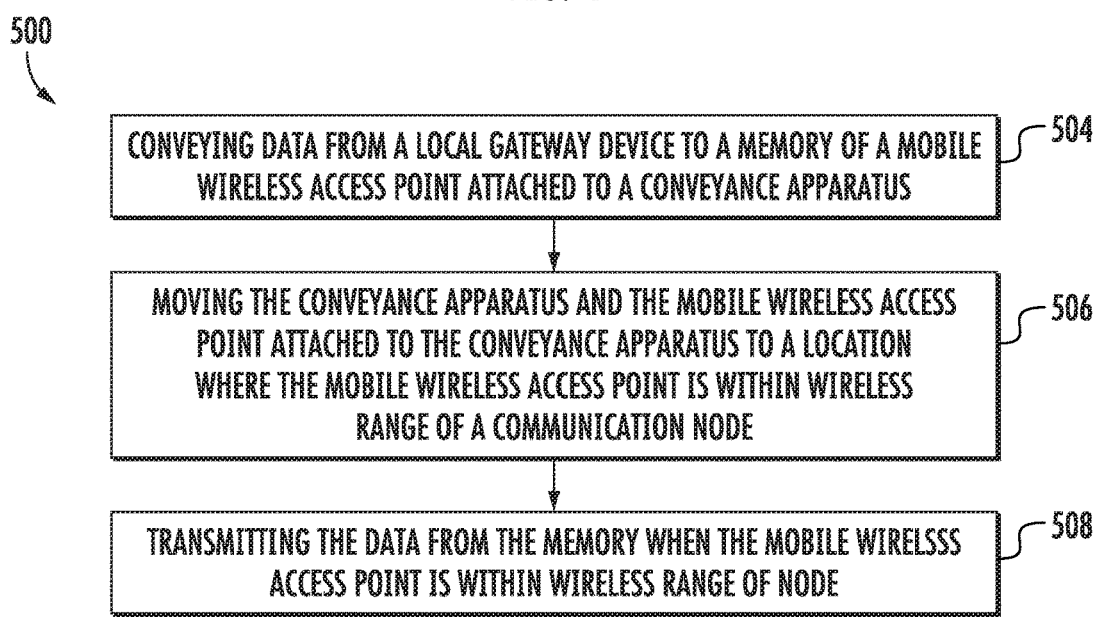
FIG. 5 is a flow chart of a method of data transfer in a conveyance system, in accordance with an embodiment of the disclosure.

Referring now to FIG. 5, while referencing components of FIGS. 1-3. FIG. 5 shows a flow chart of a method 500 for data transfer in a conveyance system, in accordance with an embodiment of the disclosure. FIG. 5 illustrates an embodiment where the data 202 is saved onto a memory 216 of the mobile wireless access point 210, however in other embodiments the data 202 may not be saved onto the memory 216 but is rather the data 202 is transferred through the mobile wireless access point 210 when the mobile wireless access point 210 is within range of both the communication node 280 and the local gateway device 240. At block 504, data 202 is conveyed from a local gateway device 240 to a memory 216 of a mobile wireless access point 210 attached to a conveyance apparatus. The data 202 may be conveyed from a local gateway device 240 to a memory 216 of a mobile wireless access point 210 by moving the conveyance apparatus and the mobile wireless access point 210 to a location where the mobile wireless access point 210 is within wireless range of a local gateway device 240; and the data 202 from the local gateway device 240 is received to the memory 216 of the mobile wireless access point 210. The data 202 may be received from the local gateway device 240 to the memory 216 via short-range wireless protocol 240.

The data 202 may be conveyed from a local gateway device 240 to a memory 216 of a mobile wireless access point 210 by receiving data 202 from the local gateway device 240 to a memory 216 of a second mobile wireless access point 210 attached to a second conveyance apparatus. The second mobile wireless access point 210 is configured to receive the data 202 from the local gateway device 240 to the memory 216 of the second mobile wireless access point 210; move the second conveyance apparatus and the second mobile wireless access point 210 to a location where the second mobile wireless access point 210 is within wireless range of the mobile wireless access point 210; and transmit the data 202 from the memory 216 of the second mobile wireless access point 210 to the memory 210 of the mobile wireless access point 210.

At block 506, the conveyance apparatus and the mobile wireless access point 210 attached to the conveyance apparatus are moved to a location where the mobile wireless access point 210 is within wireless range 282 of a communication node 280. At block 508, the data 202 is transmitted from the memory 216 when the mobile wireless access point 210 is within wireless range 282 of the communication node 280. The conveyance system of method 500 may be an elevator system 101 and the conveyance apparatus may be elevator car 103. As mentioned above, the local gateway device 240 is configured to receive the data from a remote system 290 via long-range wireless protocol 204.

While the above description has described the flow process of FIG. 5 in a particular order, it should be appreciated that unless otherwise specifically required in the attached claims that the ordering of the steps may be varied.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

As described above, embodiments can be in the form of processor-implemented processes and devices for practicing those processes, such as a processor 214 in mobile wireless access point 210. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method for data transfer in a conveyance system, the method comprising:
 moving a first conveyance apparatus and a first mobile wireless access point attached to the first conveyance apparatus to a location where the first mobile wireless access point is within wireless range of a communication node that is located on a landing;
 wirelessly receiving data from the communication node when the first mobile wireless access point is within wireless range of the communication node,
 wirelessly transmitting the data from the first mobile wireless access point to a second mobile wireless access point attached to a second conveyance apparatus; and conveying the data to the local gateway device via the second mobile wireless access point attached to the second conveyance apparatus; and transmitting the data from the local gateway device to a remote system via a network.

2. The method of claim 1, wherein the data is wirelessly received from the communication node to the first mobile wireless access point via short-range wireless protocol.

3. The method of claim 1, wherein conveying the data to a local gateway device further comprises:
wherein the second mobile wireless access point is configured to transmit the data from the second mobile wireless access point to the local gateway device.

4. The method of claim 1, wherein conveying the data to a local gateway device further comprises:
moving the second conveyance apparatus and the second mobile wireless access point to a location where the second mobile wireless access point is within wireless range of a local gateway device; and
transmitting the data from the second mobile wireless access point to the local gateway device.

5. The method of claim 1, wherein the conveyance system is an elevator system, the conveyance apparatus is a first elevator car, and the second conveyance apparatus is a second elevator car.

6. The method of claim 1, wherein the local gateway device is configured to transmit the data to the remote system via long-range wireless protocol.

7. The method of claim 1, further comprising:
saving the data to a memory of the first mobile wireless access point.

8. A method for data transfer in a conveyance system, the method comprising:
receiving data at a local gateway device, the data being sent from a remote system via a network, the conveyance system comprising a first mobile wireless access point attached to a first conveyance apparatus and a second mobile wireless point attached to a second conveyance apparatus;
wirelessly transmitting the data from the local gateway device to the second mobile wireless access point;
conveying the data to the first mobile wireless access point via the second mobile wireless access point;
wirelessly transmitting the data from the second mobile wireless access point to the first mobile wireless access point; and
wirelessly transmitting the data from the first mobile wireless access point when the first mobile wireless access point is within wireless range of a communication node that is located on a landing.

9. The method of claim 8, further comprising:
moving the second conveyance apparatus and the second mobile wireless access point to a location where the second mobile wireless access point is within wireless range of a local gateway devoce.

10. The method of claim 9, wherein the data is wirelessly transmitted from local gateway device to the second mobile wireless access point via short-range wireless protocol.

11. The method of claim 8, wherein the conveying the data to the first mobile wireless access point via the second mobile wireless access point further comprises:
moving the second conveyance apparatus and the second mobile wireless access point to a location where the second mobile wireless access point is within wireless range of the first mobile wireless access point, wherein the data is transmitted from the second mobile wireless access point to the mobile wireless access point when the second mobile wireless access point is within wireless range of the first mobile wireless access point.

12. The method of claim 8, wherein the conveyance system is an elevator system, the first conveyance apparatus is a first elevator car, and the second conveyance apparatus is a second elevator car.

13. The method of claim 8, wherein the local gateway device is configured to receive the data from the remote system via long-range wireless protocol.

14. The method of claim 8, further comprising:
saving the data to a memory of the second mobile wireless access point.

15. The method of claim 8, further comprising:
moving the first conveyance apparatus and the first mobile wireless access point attached to the first conveyance apparatus to a location where the first mobile wireless access point is within wireless range of the communication node.

16. A conveyance system, comprising:
a conveyance apparatus:
a mobile wireless access point attached to the control, the mobile wireless access point comprising:
a processor;
a memory comprising computer-executable instructions that, when executed by the processor, cause the processor to perform operations, the operations comprising:
moving a first conveyance apparatus and a first mobile wireless access point attached to the first conveyance apparatus to a location where the first mobile wireless access point is within wireless range of a communication node that is located on a landing;
wirelessly receiving the data from the communication node when the mobile wireless access point is within wireless range of the communication node;
wirelessly transmitting the data from the first mobile wireless access point to a second mobile wireless access point attached to a second conveyance apparatus; and
conveying the data to the local gateway device via the second mobile wireless access point attached to the second conveyance apparatus; and
wirelessly transmitting the data from the local gateway device to a remote system via a network.

17. The conveyance system of claim 16, wherein conveying the data to the local gateway device further comprises:
moving the second conveyance apparatus and the mobile wireless access point to a location where the second mobile wireless access point is within wireless range of the local gateway device; and
transmitting the data from the second mobile wireless access point to the local gateway device.

18. The conveyance system of claim 16, wherein the data is wirelessly received from the communication node via short-range wireless protocol.

* * * * *